(12) United States Patent
Hamasaki et al.

(10) Patent No.: US 9,337,755 B2
(45) Date of Patent: May 10, 2016

(54) MOTOR CONTROL APPARATUS

(71) Applicants: Masamitsu Hamasaki, Aichi (JP);
Takenobu Nakamura, Gifu (JP);
Shinichi Kuratani, Aichi (JP)

(72) Inventors: Masamitsu Hamasaki, Aichi (JP);
Takenobu Nakamura, Gifu (JP);
Shinichi Kuratani, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/477,467

(22) Filed: Sep. 4, 2014

(65) Prior Publication Data

US 2015/0061555 A1 Mar. 5, 2015

(30) Foreign Application Priority Data

Sep. 4, 2013 (JP) ................................. 2013-183332

(51) Int. Cl.
*H02P 6/00* (2006.01)
*B62D 5/04* (2006.01)
*H02P 6/16* (2016.01)

(52) U.S. Cl.
CPC ................ *H02P 6/002* (2013.01); *B62D 5/046* (2013.01); *H02P 6/16* (2013.01); *H02P 2205/01* (2013.01)

(58) Field of Classification Search
CPC ...................................................... H02P 6/002
USPC ................ 318/400.06, 400.01, 700
See application file for complete search history.

(56) References Cited

U.S. PATENT DOCUMENTS

| 5,874,818 | A | * | 2/1999 | Schuurman | ....... H02M 7/53873 318/280 |
|---|---|---|---|---|---|
| 6,049,474 | A | | 4/2000 | Platnic | |
| 6,735,537 | B2 | | 5/2004 | Liu et al. | |
| 7,308,192 | B2 | | 12/2007 | Williams et al. | |
| 7,336,047 | B2 | | 2/2008 | Ueda et al. | |
| 8,203,292 | B2 | | 6/2012 | Hamasaki | |
| 8,228,012 | B2 | | 7/2012 | Hamasaki et al. | |
| 8,358,098 | B2 | * | 1/2013 | Skinner | ............... H02M 1/4208 307/98 |
| 8,471,511 | B2 | * | 6/2013 | Kitagawa | ....................... 318/432 |
| 8,810,052 | B2 | * | 8/2014 | Kishibata | ............... G05B 19/00 257/706 |

FOREIGN PATENT DOCUMENTS

| JP | 10-155278 | A | 6/1998 |
|---|---|---|---|
| JP | 2001-095279 | A | 4/2001 |
| JP | 2005-531270 | A | 10/2005 |
| JP | 2007-112416 | A | 5/2007 |
| JP | 2010-279141 | A | 12/2010 |
| JP | 4833186 | B2 | 12/2011 |
| JP | 4884355 | B2 | 2/2012 |
| JP | 4884356 | B2 | 2/2012 |

* cited by examiner

*Primary Examiner* — David S Luo
(74) *Attorney, Agent, or Firm* — Osha Liang LLP

(57) ABSTRACT

A motor control apparatus has an inverter circuit having a plurality of pairs of upper and lower arms provided so as to correspond to the number of phases, and switching elements provided on each of the upper arms and the lower arms of each phase that drive a motor on the basis of ON or OFF operations of the respective switching elements, a single current detector that detects a current of the motor flowing through the inverter circuit, and a duty calculator that calculates duties of a PWM signals for turning the switching elements ON or OFF on the basis of a deviation between a current value of the current detected by the current detector and a target current value.

9 Claims, 10 Drawing Sheets

ROTATIONAL ANGLE OF MOTOR

ROTATIONAL ANGLE OF MOTOR

| PATTERN | | MAXIMUM PHASE | INTERMEDIATE PHASE | MINIMUM PHASE |
|---|---|---|---|---|
| #2 | (30° — 90°) | PHASE A | PHASE B | PHASE C |
| #3 | (90° — 150°) | PHASE A | PHASE C | PHASE B |
| #4 | (150° — 210°) | PHASE C | PHASE A | PHASE B |
| #5 | (210° — 270°) | PHASE C | PHASE B | PHASE A |
| #6 | (270° — 330°) | PHASE B | PHASE C | PHASE A |
| #1 | (330° — 360°) (0° — 30°) | PHASE B | PHASE A | PHASE C |

FIG. 13A PATTERN #2
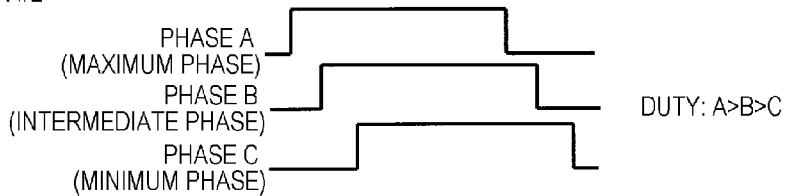
FIG. 13B PATTERN #3
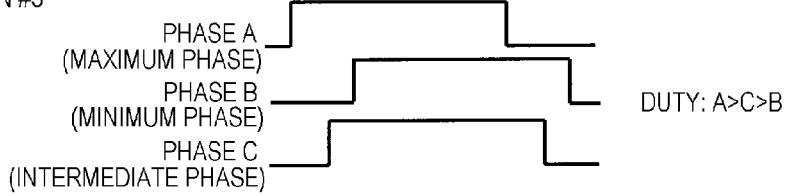
FIG. 13C PATTERN #4
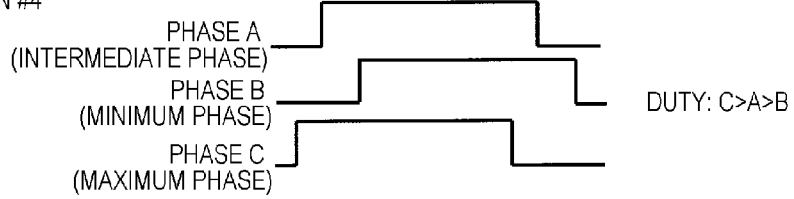
FIG. 13D PATTERN #5
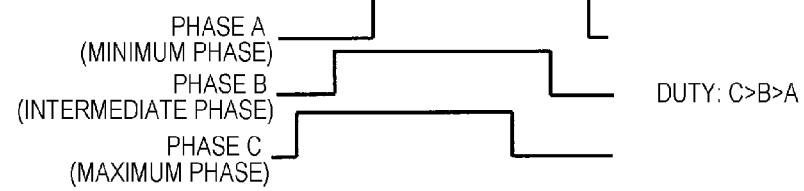
FIG. 13E PATTERN #6
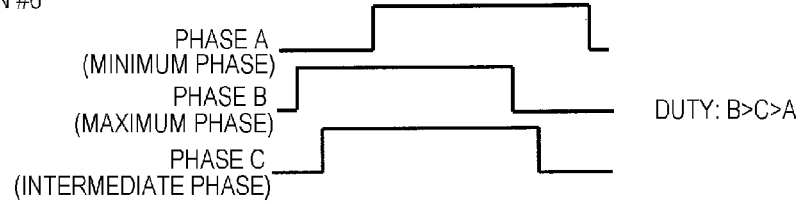
FIG. 13F PATTERN #1
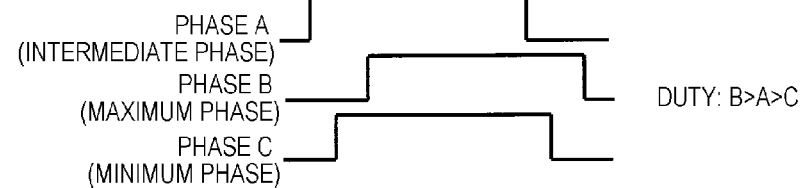

MOTOR CONTROL APPARATUS

BACKGROUND OF THE INVENTION

1. Field of the Invention

The present invention relates to a motor control apparatus configured to control a motor on the basis of a PWM (Pulse Width Modulation) system and, more specifically, to a motor control apparatus configured to detect currents in respective phases by using a single current detector.

2. Description of Related Art

For example, an electric power steering apparatus of a vehicle is provided with an electric motor such as a 3-phase brushless motor in order to provide a steering function with a steering auxiliary power in accordance with a steering torque of a steering handle. Examples of the motor control apparatus configured to control rotations of the motor includes a motor control apparatus on the basis of the PWM system (see JP-A-2010-279141, Japanese Patent No. 4833186, Japanese Patent No. 4884355, Japanese Patent No. 4884356, JP-A-2007-112416, JP-A-10-155278, JP-T-2005-531270, JP-A-2001-95279, and U.S. Pat. No. 6,735,537).

In general, the motor control apparatus on the basis of the PWM system includes an inverter circuit configured to drive a motor on the basis of a PWM signal, a control unit configured to control an action of the inverter circuit, and a current detection circuit configured to detect motor currents. The inverter circuit includes the same number of pairs of upper and lower arms as the number of phases, and each pair of the upper arm and the lower arm is provided with a switching element. The current detection circuit includes a current detection resistance (hereinafter, referred to as "shunt resistance") configured to detect motor currents in respective phases flowing in the inverter circuit. The control unit generates PWM signals having predetermined duties for the respective switching elements of the inverter circuit on the basis of a deviation between a target value of current to be fed to the motor and a value of the current detected by the shunt resistance, and outputs the generated PWM signals to the inverter circuit. The respective switching elements of the inverter circuit perform ON-OFF operations on the basis of the PWM signals. Accordingly, the current flows from a power source through the inverter circuit to the motor, and hence the motor rotates.

In the case where the shunt resistance configured to detect the motor current is provided on the lower arm for each phase of the inverter circuit, a current in each phase flowing to the motor may be detected as an actual measured value. However, in this case, the same number of shunt resistances as the number of the phases are required, and hence the configuration of a circuit becomes complicated. Therefore, detection of the current in each phase by using a single shunt resistance has been performed in the related art (see JP-A-2010-279141, Japanese Patent No. 4833186, Japanese Patent No. 4884355, Japanese Patent No. 4884356, and JP-A-2007-112416). This system is referred to as "single shunt system", hereinafter. In the single shunt system, currents in two phases flowing through the shunt resistance are detected, and a current in a remaining phase is obtained by an arithmetic operation on the basis of the detected values (detailed description will be given later).

SUMMARY

One or more embodiments of the invention provides a motor control apparatus that achieves a reduction of noise.

The motor control apparatus of one or more embodiments of the invention includes: an inverter circuit having a plurality of pairs of upper and lower arms provided so as to correspond to the number of phases and switching elements provided on each of the upper arms and the lower arms of each phase and being configured to drive a motor on the basis of ON or OFF operations of the respective switching elements; a single current detector configured to detect a current of the motor flowing through the inverter circuit: a duty calculator configured to calculate duties of PWM signals for turning the switching elements ON or OFF on the basis of a deviation between a current value of the current detected by the current detector and a target current value; a PWM signal generator configured to generate the PWM signals on the basis of the duties calculated by the duty calculator and output the corresponding PWM signals to the respective switching elements; a phase shifting unit configured to compare the magnitude of the duties calculated by the duty calculator and shift the phases of the PWM signals of the predetermined phases on the basis of a result of comparison; and a phase state maintaining unit configured to maintain the shift state of the phases generated by the phase shifting unit. The phase state maintaining unit maintains the state of phase shift generated by the phase shifting unit when the duties of all the phases calculated by the duty calculator are continuously 50%.

In this configuration, when the duties in the respective phases are continuously 50%, the phase shift of the PWM signals is not performed and the state of the phase shifted once is maintained. Therefore, transition of the patterns does not occur even though the duties are slightly changed. Therefore, the states of phase shift of the PWM signals are not switched frequently, and hence generation of noise, which is caused by the switching frequencies being included within the audible frequency range, is suppressed.

According to one or more embodiments of the present invention, the phase state maintaining unit maintains the state of phase shift generated by the phase shifting unit when the duties of all the phases calculated by the duty calculator are continuously included within a range from 50%+$\alpha$ as an upper limit to 50%−$\beta$ including 50%, and being lower than a predetermined value. According to one or more embodiments of the present invention, the values of $\alpha$ and $\beta$ satisfy an equality of $\alpha=\beta=1\%$, and the range lower than the predetermined value is 51% to 49%.

According to one or more embodiments of the present invention, the phase state maintaining unit maintains the state of phase shift generated by the phase shifting unit in a state in which rises of the PWM signals in the respective phases are shifted in timing by time lengths which allow detection of the currents by the current detector.

According to one or more embodiments of the present invention, the phase state maintaining unit maintains the state of phase shift generated by the phase shifting unit when the difference between a maximum value and a minimum value of the duties in the respective phases calculated by the duty calculator is continuously smaller than a predetermined value.

According to one or more embodiments of the present invention, a phase movement frequency reducer configured to reduce the frequency of phase shift by the phase shifting unit when the duties of all the phases calculated by the duty calculator are continuously 50% is provided instead of the phase state maintaining unit.

According to one or more embodiments of the present invention, a phase movement frequency reducer configured to reduce the frequency of phase shift by the phase shifting unit when the difference between the maximum value and the minimum value of the duties of the respective phases calculated by the duty calculator is continuously smaller than the predetermined value is provided instead of the phase state maintaining unit.

According to one or more embodiments of the invention, a motor control apparatus that achieves a reduction of noise caused by a change in duties of PWM signals is provided.

BRIEF DESCRIPTION OF THE DRAWINGS

FIGS. 13A to 13F are drawings illustrating the PWM signals corresponding to respective patterns.

DETAILED DESCRIPTION

Figure 1:
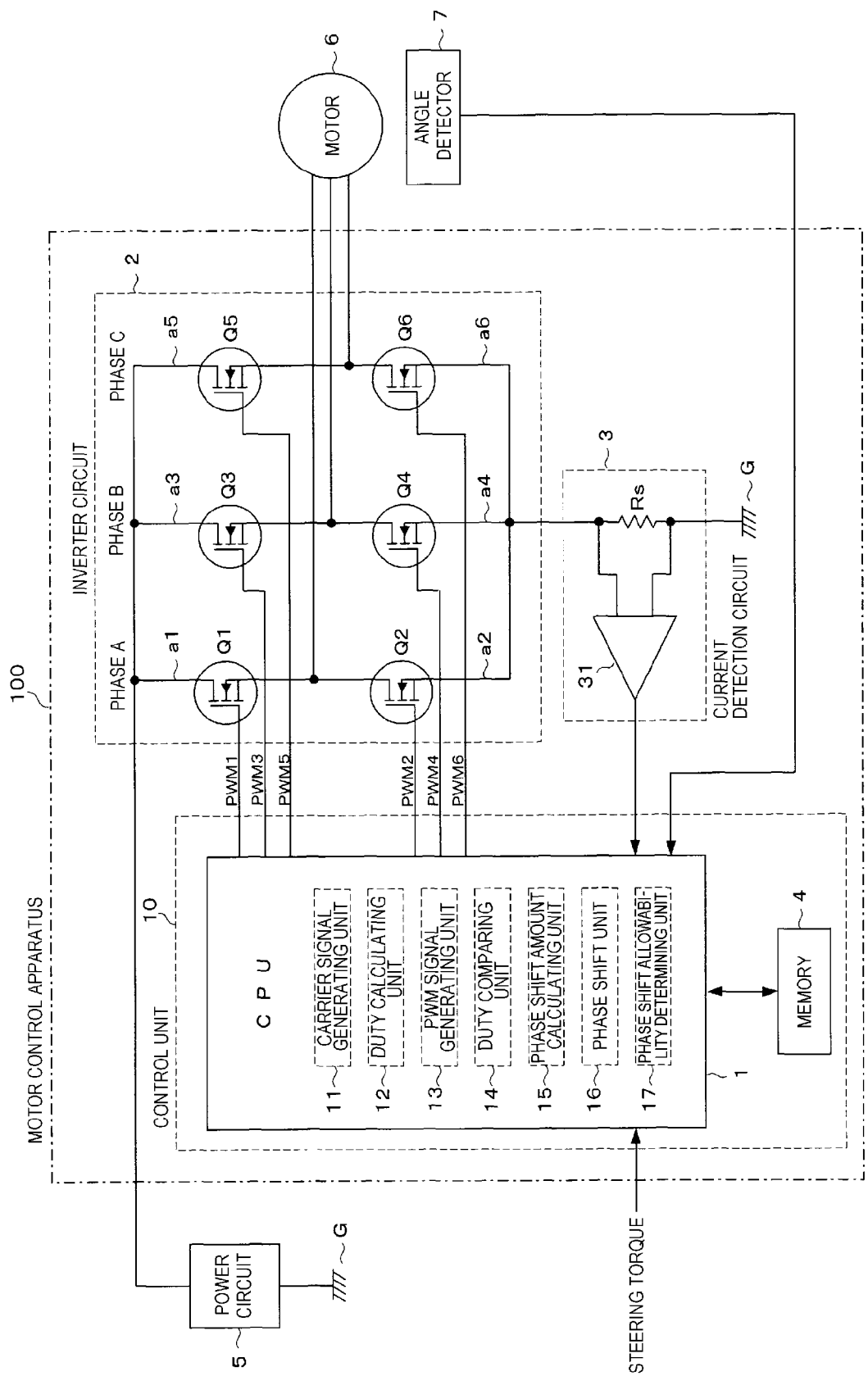
FIG. 1 is a circuit diagram of a motor control apparatus according to one or more embodiments of the invention.

Embodiments of the present invention will be described below with reference to the drawings. In the drawings, similar or corresponding components may be denoted by the same reference signs. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 6:
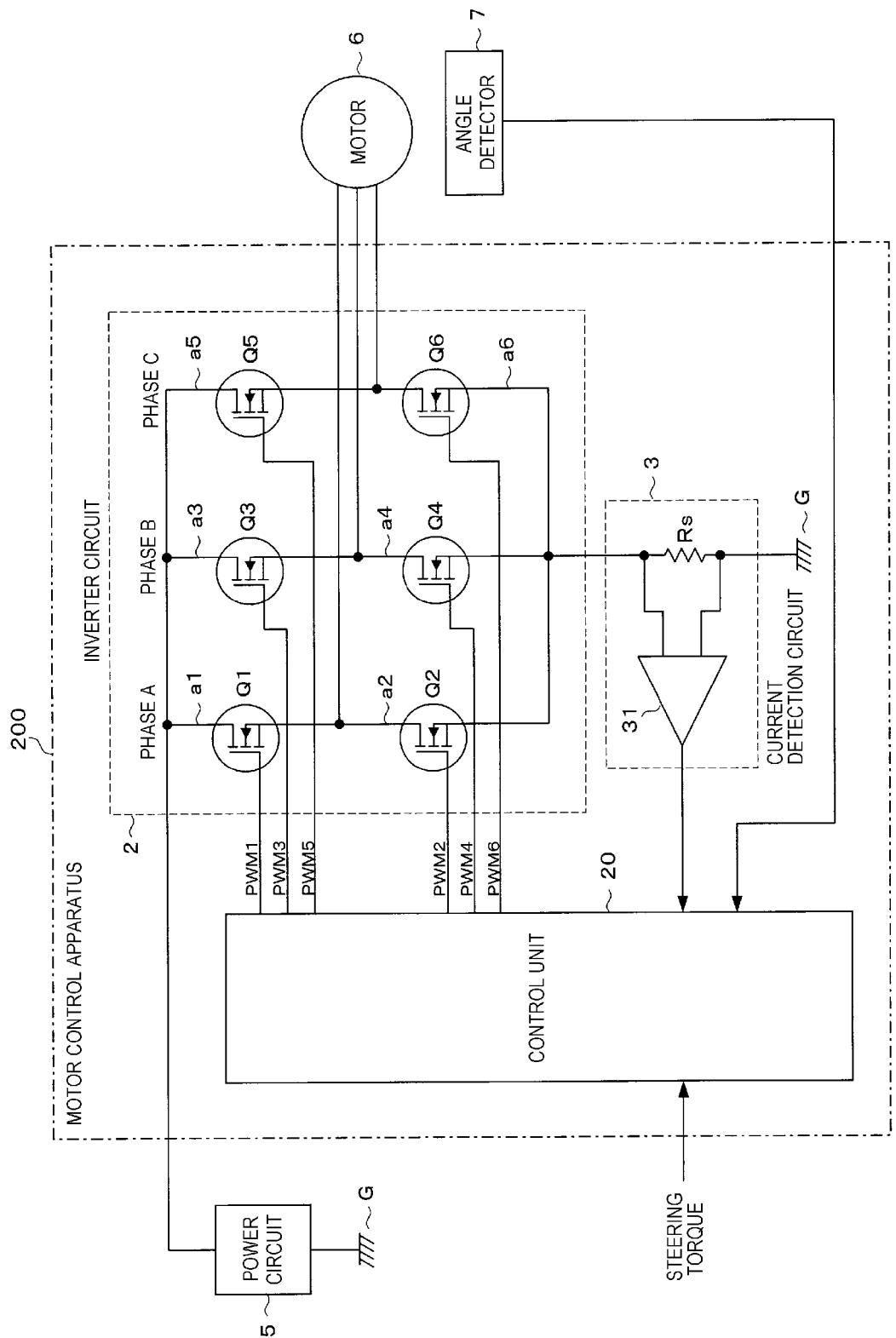
FIG. 6 is a circuit diagram illustrating an example of the motor control apparatus on the basis of a single shunt system.

FIG. 6 illustrates an example of the motor control apparatus on the basis of the single shunt system. A motor control apparatus 200 is provided between a power circuit 5 and a motor 6, and includes an inverter circuit 2, a current detection circuit 3, and a control unit 20. The motor 6 is, for example, a 3-phase brushless motor used in an electric power steering apparatus of a vehicle. In order to detect a rotational angle of the motor 6, an angle detector 7 such as a resolver is provided. The power circuit 5 includes a DC power source, a rectifying circuit, and a smoothing circuit.

The inverter circuit 2 includes a 3-phase bridge provided with three pairs of upper and lower arms corresponding to Phase A, Phase B, and Phase C. An upper arm a1 and a lower arm a2 in Phase A have switching elements Q1 and Q2, respectively. An upper arm a3 and a lower arm a4 in Phase B have switching elements Q3 and Q4, respectively. An upper arm a5 and a lower arm a6 in Phase C have switching elements Q5 and Q6, respectively. These switching elements Q1 to Q6 are, for example, composed of FET (field-effect transistors). Hereinafter, the switching element for the upper arm for each phase is referred to as "upper switching element", and the switching element for the lower arm for each phase is referred to as "lower switching element"

The current detection circuit 3 configured to detect currents flowing to the motor 6 includes a shunt resistance Rs and an amplifier circuit 31. The shunt resistance Rs is connected between the inverter circuit 2 and the ground G. The amplifier circuit 31 is configured to amplify a voltage at both ends of the shunt resistance Rs and outputs an amplified voltage to the control unit 20. The control unit 20 calculates duties of the PWM signals in the respective phases on the basis of a deviation between a detected current value calculated from the voltage supplied by the amplifier circuit 31 and a target current value calculated from a steering torque supplied by a torque sensor (not illustrated). The PWM signals (PWM1 to PWM6) in the respective phases generated on the basis of the duties are output to the inverter circuit 2. The switching elements Q1 to Q6 of the inverter circuit 2 perform the ON-OFF operation on the basis of these PWM signals. Accordingly, the current flows from the power circuit 5 through the inverter circuit 2 to the motor 6, and hence the motor 6 rotates. Subsequently, the magnitude and the direction of the current flowing to the motor 6 are controlled in accordance with ON-OFF patterns of the switching elements Q1 to Q6 in accordance with the duties and the phases of the PWM signals.

Figure 7:
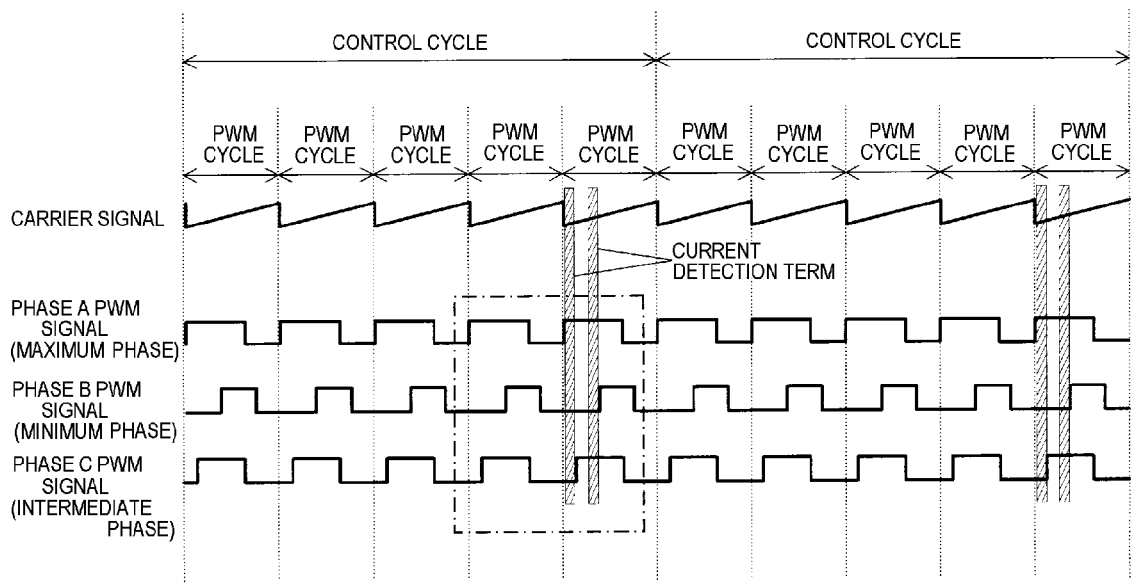
FIG. 7 is a timing chart illustrating a carrier signal and PWM signals in respective phases.

FIG. 7 to FIG. 10 are explanatory drawings illustrating a principle of motor current detection on the basis of the single shunt system. As illustrated in FIG. 7, PWM signals in the respective phases in accordance with duties of Phase A, Phase B, and Phase C are generated on the basis of sawtooth-like carrier signals. Since a method of generating PWM signals are well known, description will be omitted here. Hereinafter, a phase having a maximum duty is referred to as "maximum phase", a phase having a minimum duty is referred to as "minimum phase", and a phase having an intermediate duty is referred to as "intermediate phase". In FIG. 7, Phase A corresponds to the maximum phase, Phase B corresponds to the minimum phase, and Phase C corresponds to the intermediate phase.

The PWM signals in the respective phases in FIG. 7 represent PWM signals to be supplied to the upper switching elements for the respective phases (PWM1, PWM3, and PWM5 in FIG. 6). The same applies to the drawings to be described below. The PWM signals to be supplied to the lower switching elements of the respective phases (PWM2, PWM4, and PWM 6 in FIG. 6) correspond substantially to signals obtained by inverting the PWM signals in the respective phases from those in FIG. 7. The PWM cycle illustrated in FIG. 7 corresponds to a period from a fall to a next fall of a carrier signal, and one control cycle includes five PWM cycles. One PWM cycle is, for example, 50 μs. In this case, one control cycle is 250 μs. Hatched portions illustrated in FIG. 7 indicate current detection terms for detecting currents flowing to the shunt resistance Rs. The current detection terms are set as predetermined terms until the respective PWM signals in the intermediate phase (Phase C) and the minimum phase (Phase B) rise in the last PWM cycles of the respective control cycles.

Figure 8:
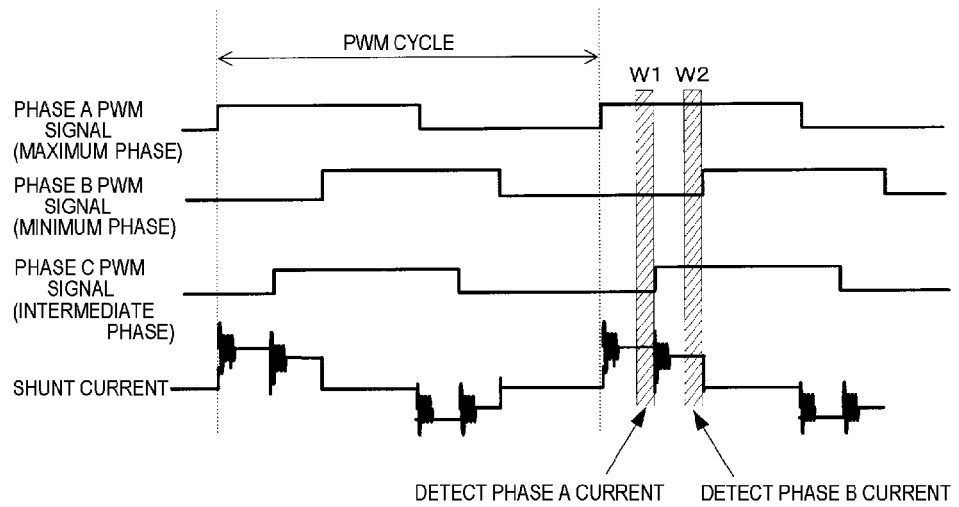
FIG. 8 is an enlarged drawing illustrating a portion surrounded by an alternate long and short dash line in FIG. 7.

FIG. 8 is a drawing illustrating a portion surrounded by an alternate long and short dash line in FIG. 7 in an enlarged scale, added with a waveform of a current flowing through the shunt resistance Rs (shunt current). In FIG. 8, W1 represents a current detection term in which a current in Phase A is to be detected, and W2 represents a current detection term in which a current in Phase B is to be detected.

Figure 9:
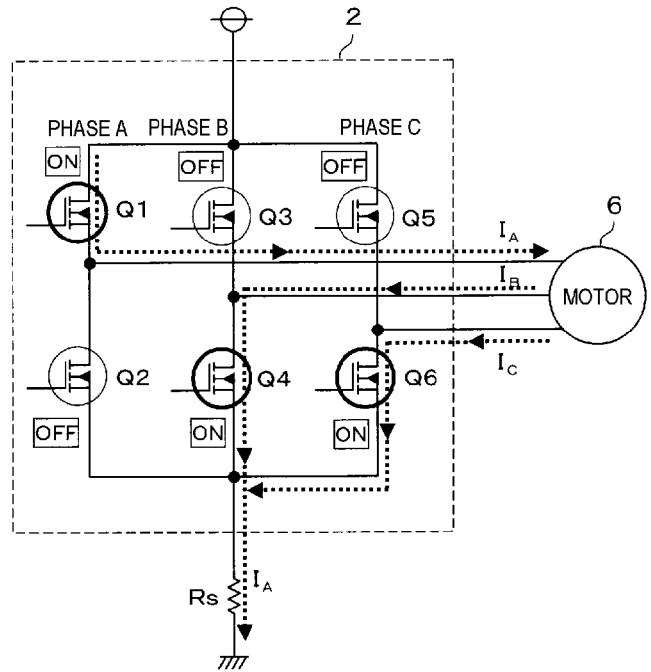
FIG. 9 is a drawing illustrating current routes of an inverter circuit in a current detection term W1.

In the current detection term W1, the PWM signal in Phase A is "H" (High), the PWM signal in Phase B is "L" (Low), and the PWM signal in Phase C is "L". Therefore, as illustrated in FIG. 9, the upper switching elements Q1, Q3, and Q5 are ON, OFF, OFF, respectively, and the lower switching elements Q2, Q4, Q6 are OFF, ON, ON, respectively. Consequently, current routes indicated by broken line arrows in FIG. 9 are formed, and a Phase A current IA flows to the shunt resistance Rs. Voltages generated by the Phase A current IA at both ends of the shunt resistance Rs enter the control unit 20 via the amplifier circuit 31 (FIG. 6), and are A/D converted (analogue-digital conversion) in the control unit 20, whereby the current value IA of the current in Phase A is detected.

Figure 10:
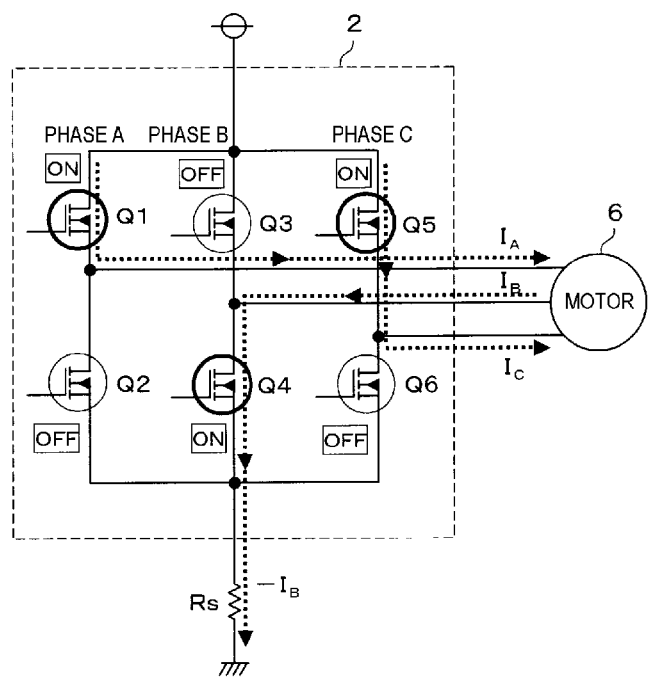
FIG. 10 is a drawing illustrating current routes of the inverter circuit in a current detection term W2.

In the current detection term W2, the PWM signal in Phase A is "H", the PWM signal in Phase B is "L", and the PWM signal in Phase C is "H". Therefore, as illustrated in FIG. 10, the upper switching elements Q1, Q3, and Q5 are ON, OFF, ON, respectively, and the lower switching elements Q2, Q4, Q6 are OFF, ON, OFF, respectively. Consequently, current routes indicated by broken line arrows in FIG. 10 are formed and Phase B current −IB having an opposite polarity flows to the shunt resistance Rs. Voltages generated by the Phase B current −IB at both ends of the shunt resistance Rs enter the control unit 20 via the amplifier circuit 31 (FIG. 6) and are A/D converted in the control unit 20, so that a current value IB of the B-phase current is detected.

When the current value IA of the Phase A current and the current value IB of the Phase B current are detected, the current value IC of the Phase C current can be obtained by arithmetic operation by using the values IA and IB. In other words, according to Kirchhoff's law, a relationship of IA+IB+IC=0 is established among the current values of the respective phases IA, IB, and IC, so that the current value IC of the Phase C current can be calculated as IC=−(IA+IB).

In order to achieve a normal A/D conversion of the current detected by the shunt resistance Rs in the control unit 20 the current detected by the shunt resistance Rs in the motor control apparatus 200 on the basis of the single shunt system as described above, a current having the constant magnitude needs to flow continuously for a certain period (for example, at least 2 μs) to the shunt resistance Rs. Therefore, intervals of timing at which the switching elements Q1 to Q6 of the inverter circuit 2 are turned ON or OFF may become very short between one phase and another phase depending on the magnitude relationship among duties of the PWM signals in the respective phases. In this state, since currents required for the detection of the current do not flow to the shunt resistance Rs, currents in two phases are not detected, and hence calculation of a current in remaining one phase becomes impossible.

Therefore, a method of shifting the phases of the PWM signals is known for cases where the intervals of timing at which the switching elements are turned ON or OFF is shorter than a threshold value between one phase and another phase is known (see JP-A-2010-279141, and U.S. Pat. No. 6,735, 537). For example, in FIG. 7, the phase of the Phase C PWM signal in the intermediate phase is shifted backward with respect to the Phase A PWM signal in the maximum phase. The phase of the Phase B PWM signal in the minimum phase is shifted further backward with respect to the phase of the Phase C PWM signal in the intermediate phase. With such phase shifting, the intervals of timing at which the switching elements are turned ON or OFF between one phase and another phase are increased, so that the currents flows to the shunt resistance Rs only for a period required for detecting the current. Consequently, sufficient current detection terms W1 and W2 are secured, and hence the 2-phase current flowing to the motor 6 is accurately detected.

However, there is generation of noise in the motor caused by a current ripple in association with an abrupt fluctuation of the motor current as a result of phase shifting of the PWM signals. Technologies that address prevention of generation of such noise are disclosed in Japanese Patent No. 4833186, Japanese Patent No. 4884355, and Japanese Patent No. 4884356. In Japanese Patent No. 4833186, when shifting the phases in accordance with a plurality of patterns classified on the basis of a magnitude relationship of the duties of the PWM signals, a hysteresis property is given to the duties between adjacent patterns lying next to each other with a point where the magnitude relationship of the duties is changed as a boundary. In Japanese Patent No. 4884355, when detection of currents by a current detector is determined to be impossible, the phases of the PWM signals of predetermined phases in one control cycle are shifted in every PWM cycles by the same amount. In Japanese Patent No. 4884356, the phases of the PWM signals are gradually shifted by increasing the phase shift amount gradually from zero or decreasing the same gradually toward zero in one control cycle.

In the motor control apparatus described above, depending on the results of an arithmetic operation of the duties, all the duties of the PWM signals in the respective phases may be around 50%. For example, in an electric power steering apparatus, the duties of the PWM signals in the respective phases show 50% in a state in which the steering handle is not turned (in a neutral state).

Figures 11, 12:
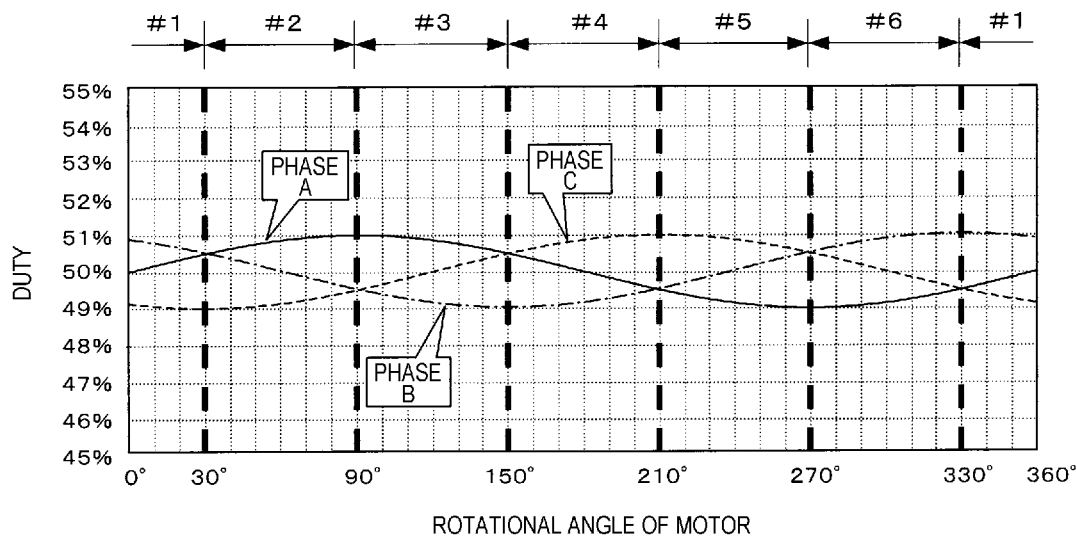
FIG. 11 is a drawing illustrating a relationship between the rotational angle of the motor and the duty.
FIG. 12 is a table illustrating a relationship of the respective patterns in FIG. 11 with respect to a maximum phase, an intermediate phase, and a minimum phase.

FIG. 11 illustrates a relationship between the rotational angle of the motor and the duty in a case where the duties in the respective phases are around 50%. The respective duties in Phase A, Phase B and Phase C all change within a range from 49% to 51% (50%±1%)±centered at 50%. The magnitude relationship of the duties among Phase A, Phase B, and Phase C are switched at intervals of 60°, and this magnitude relationship may be classified into six patterns from #1 to #6. The relationship of the respective patterns with respect to the maximum phase, the intermediate phase and the minimum phase is illustrated in FIG. 12.

As illustrated in FIG. 11, when the respective duties of Phase A, Phase B, and Phase C change around 50%, transition of the pattern occurs even with a small duty change. For example, it is assumed that the current pattern is the pattern #2, and respective duties DA, DB, DC of Phase A, Phase B, and Phase 3 are DA=50.8%, DB=50.1%, and DC=49.3% (DA>DB>DC). At this time, the state of phase shift of the PWM signals in the respective phases is as illustrated in FIG. 13A. FIGS. 13A to 13F each illustrate the PWM signals in the respective phases in one PWM cycle.

Assuming that the respective duties DA, DB, DC are changed from this state to DA=50.9%, DB=49.2%, and DC=50.0%, the magnitude relationship between Phase B and Phase C is switched, and the pattern is changed from the pattern #2 to the pattern #3 (DA>DC>DB). The amounts of change of the duties in the respective phases ΔDA, ΔDB, and ΔDC are ΔDA=0.1%, ΔDB=−0.9%, and ΔDC=0.7%. Switching of the magnitude relationship of the duties between Phase B and Phase C changes the state of phase shift of the PWM signals in the respective phases as illustrated in FIG. 13B.

Assuming that the respective duties DA, DB, DC are changed from the state of the pattern #2 to DA=49.8%, DB=49.3%, and DC=50.9%, the magnitude relationship between Phase A and Phase B is switched, and the pattern is changed from the pattern #2 to the pattern #4 (DC>DA>DB). The amounts of change of the duties in the respective phases ΔDA, ΔDB, and ΔDC are ΔDA=−0.1%, ΔDB=−0.8%, and ΔDC=1.6%. Switching of the magnitude relationship of the duties among Phase A, Phase B and Phase C changes the state of phase shift of the PWM signals in the respective phases as illustrated in FIG. 13C.

In the same manner, slight changes of the duties DA, DB, and DC in the respective phases may cause a transition from one pattern to any other pattern. In association with the transition as described above, the state of phase shift of the PWM signals in the respective phases change among the patterns illustrated in FIGS. 13A to 13F, and hence the state of phase shift is switched frequently. Noise may be generated from the inverter circuit or from the motor if the frequency of this switching is included in a range of audible frequencies.

Figure 14:
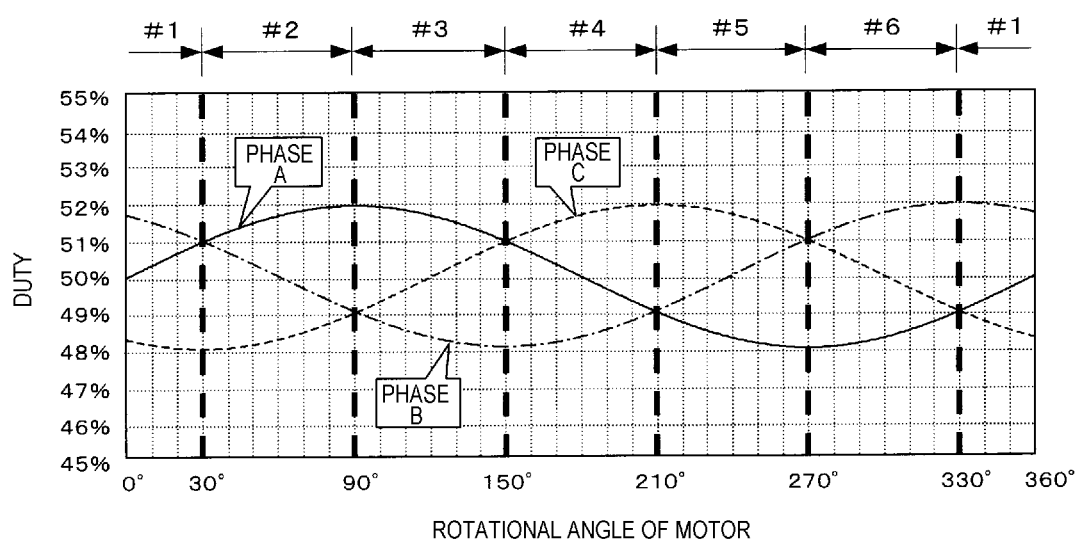
FIG. 14 is a drawing illustrating a relationship between the rotational angle of the motor and the duty.

In contrast, when the duties in the respective phases all change within a range from 48% to 52% (50%±2%) centered at 50% as illustrated in FIG. 14, the frequency of occurrence of the pattern transition due to a slight change of the duties is lower than the case illustrated in FIG. 11. For example, assuming that the current pattern is the pattern #2, and the duties in the respective phases change within the range of 50%±1%, patterns to be moved from the pattern #2 are only the pattern #1 and the pattern #3, which are two patterns adjacent to the pattern #2. The transition to the pattern #3 occurs when the magnitude relationship of the duties is switched between Phase B and Phase C, and the transition to the pattern #1 occurs when the magnitude relationship of the duties is switched between Phase A and Phase B. Therefore, the state of phase shift of the PWM signals of the respective phases changes only among the patterns illustrated in FIGS. 13A, 13B, and 13F.

It is found from the above that how the noise generated in association with slight changes of the duties is prevented when the duties in the respective phases change around 50% as illustrated in FIG. 11 is important.

With reference to FIG. 1, a configuration of a motor control apparatus will be described. A motor control apparatus 100 is provided between a power circuit 5 and a motor 6, and includes an inverter circuit 2, a current detection circuit 3, and a control unit 10. The motor 6 is, for example, a 3-phase brushless motor used in an electric power steering apparatus of a vehicle. In order to detect a rotational angle of the motor 6, an angle detector 7 such as a resolver is provided. A configuration of the motor control apparatus 100 illustrated in FIG. 1 is basically the same as the configuration of the motor control apparatus 200 illustrated in FIG. 6. However, the function of the control unit 10 is different from the function of the control unit 20 in FIG. 6 (detailed description will be given later).

The control unit 10 includes a CPU 1 and a memory 4. CPU 1 includes a carrier signal generating unit 11, a duty calculating unit 12, a PWM signal generating unit 13, a duty comparing unit 14, a phase shift amount calculating unit 15, a phase shift unit 16, and a phase shift allowability determining unit 17. The memory 4 includes ROM and RAM. Since the inverter circuit 2, the current detection circuit 3, and the power circuit 5 are the same as those described in conjunction with FIG. 6, description of these components will be omitted.

Figure 2:
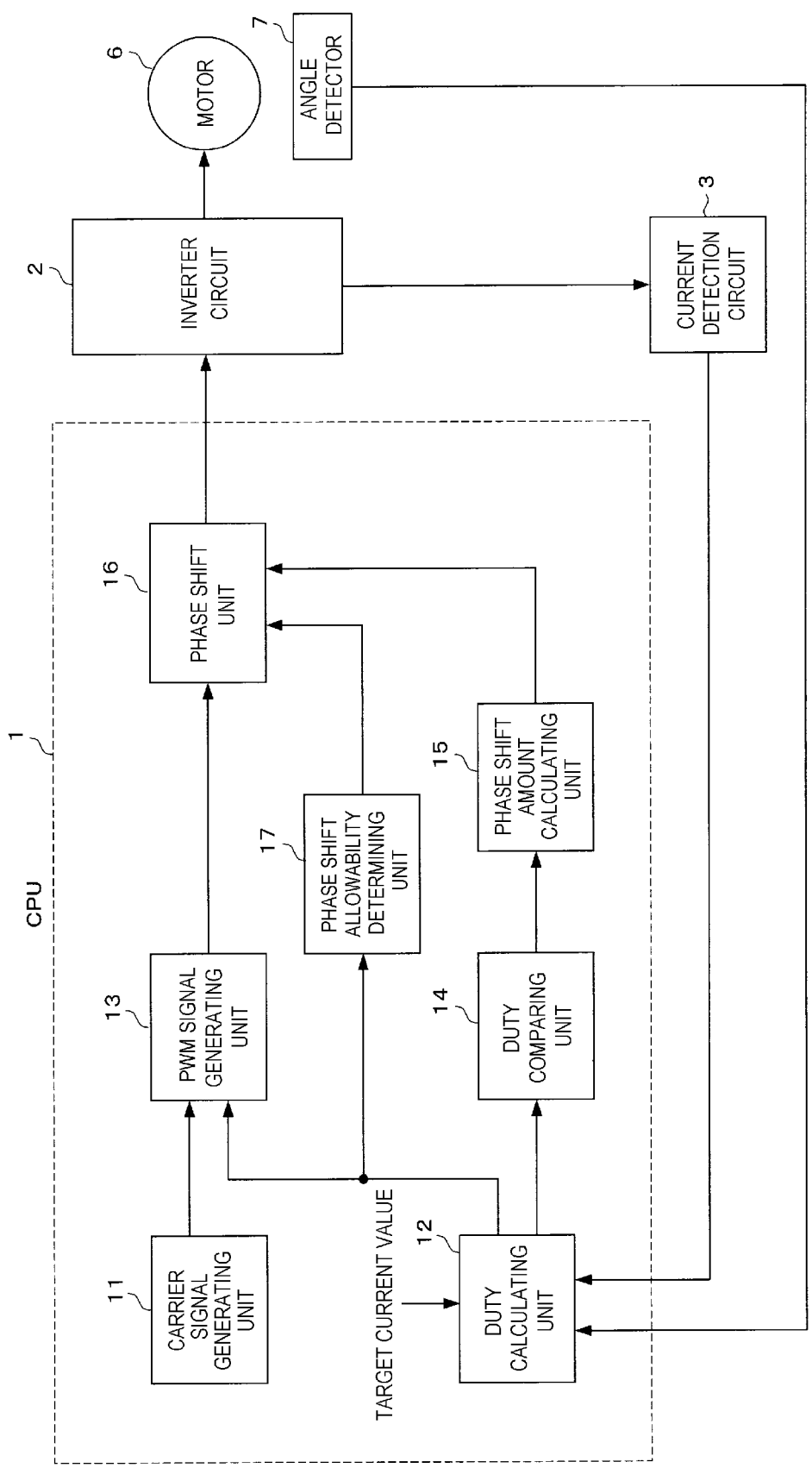
FIG. 2 is a block diagram illustrating a mutual relationship of respective components of a CPU.

FIG. 2 is a block diagram illustrating a mutual relationship among respective components 11 to 17 of the CPU 1. Actually, functions of these components 11 to 17 are implemented by software.

The carrier signal generating unit 11 generates a sawtooth-shaped carrier signal illustrated in FIG. 7. The duty calculating unit 12 is configured to calculate duties of the PWM signals in the respective phases on the basis of a deviation between a current value of a motor current detected by the current detection circuit 3 and a target current value calculated by a steering torque supplied by a torque sensor (not illustrated), and the rotational angle of the motor 6 supplied by the angle detector 7. The PWM signal generating unit 13 generates the PWM signals (PWM1 to PWM6 in FIG. 1) in the respective phases on the basis of the carrier signal generated by the carrier signal generating unit 11 and the duties calculated by the duty calculating unit 12, and outputs the generated PMW signals to the inverter circuit 2 via the phase shift unit 16.

The duty comparing unit 14 compares the duties in the respective phases calculated by the duty calculating unit 12, and determines a maximum phase having a maximum duty, a minimum phase having a minimum duty, and an intermediate phase having an intermediate duty. In other words, the duties of the respective phases are ranked in terms of magnitude. The phase shift amount calculating unit 15 calculates phase shift amounts on the basis of the result of ranking in the duty comparing unit 14. The phase shift unit 16 shifts the phases of the PWM signals having predetermined phases generated by the PWM signal generating unit 13 on the basis of the phase shift amounts calculated by the phase shift amount calculating unit 15. The phase shift allowability determining unit 17 determines allowability of the phase shift by the phase shift unit 16 on the basis of the duties in the respective phases calculated by the duty calculating unit 12.

In the configuration described above, the shunt resistance Rs is an example of "current detector" of one or more embodiments of the invention. The duty calculating unit 12 is an example of "duty calculator" of one or more embodiments of the invention. The PWM signal generating unit 13 is an example of "PWM signal generator" of one or more embodiments of the invention. The duty comparing unit 14, the phase shift amount calculating unit 15, and the phase shift unit 16 are examples of "phase shifting unit" of one or more embodiments of the invention. The phase shift allowability determining unit 17 is an example of "phase state maintaining unit" of one or more embodiments of the invention.

Figure 3:
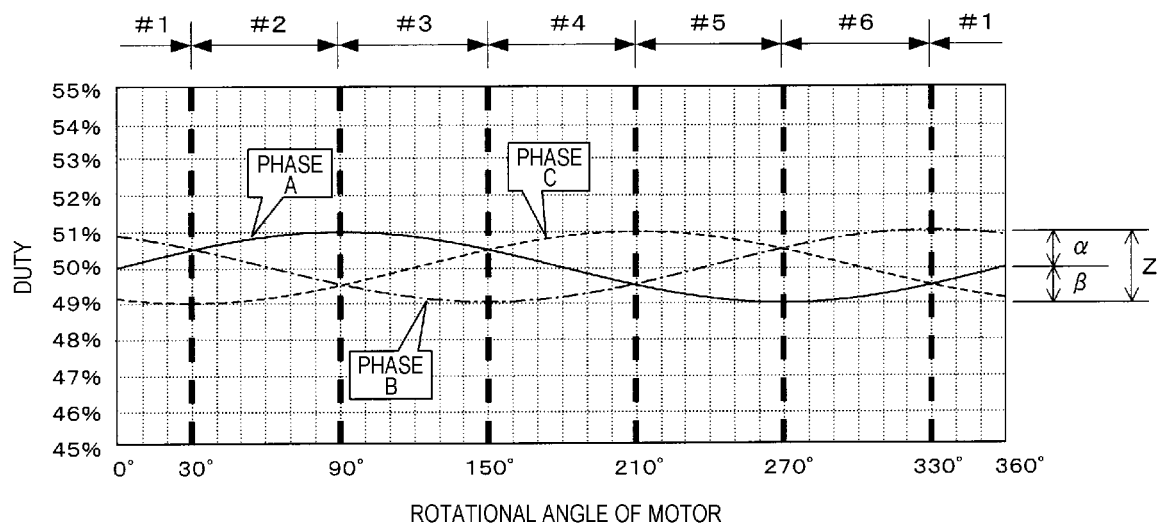
FIG. 3 is a drawing illustrating a relationship between the rotational angle of a motor and the duty.

Subsequently, phase shifting performed by the motor control apparatus 100 described above will be described. In FIG. 2, the duties in the respective phases calculated by the duty calculating unit 12 are compared by the duty comparing unit 14, and are ranked. On the basis of the result of the ranking, the phase shift amounts are calculated by the phase shift amount calculating unit 15. On the basis of the phase shift amounts, the phase shift of the PWM signals in the predetermined phases is performed by the phase shift unit 16. The actions described thus far are the same as those of the related art. In contrast, the phase shift allowability determining unit 17 monitors the respective duties in Phase A, Phase B, and Phase C calculated by the duty calculating unit 12. When the duties in all the phases are continuously within a range Z illustrated in FIG. 3, the phase movement allowability determining unit 17 determines that the phase shift is not allowed, and then outputs a phase state maintaining signal for maintaining the current state of phase shift to the phase shift unit 16. Accordingly, the phase shift of the PWM signals is not performed by the phase shift unit 16, and the current state of phase shift is maintained. In other words, the duties of all the phases are continuously within the range Z illustrated in FIG. 3, the phases shifted once are not shifted any longer and maintained as-is.

Here, Z is a range from 50%+α as an upper limit to 50%−β including 50%, and being lower than a predetermined value. The values of α and β may be the same value, and may be different values. The values of α and β include 0%. When both of α and β are 0%, the state of phase shift is maintained only when the duties of all of Phase A, Phase B, and Phase C are 50%. In the example illustrated in FIG. 3, equalities of α=β=1%, and Z=51% to 49% are satisfied. Therefore, the state of phase shift is maintained if the duties of all of Phase A, Phase B, and Phase C are within the range from 51% to 49%.

In this manner, in one or more embodiments of the present invention, the state of phase shift is maintained when the duties in the respective phases are 50%, or when the duties in the respective phases are within the predetermined range Z including 50%. As a result, even though the duties are slightly changed around 50%, the transition of the pattern does not occur. Therefore, since the state of phase shift of the PWM signals is not switched frequently, noises in the inverter circuit 2 or the motor 6, which is caused by the switching frequencies being included within the audible frequency range, may be reduced.

Figure 4:
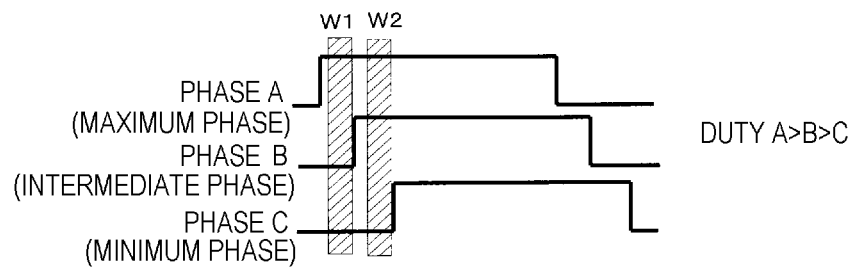
FIG. 4 is a drawing illustrating a state of phase shift in a pattern #2 in FIG. 3

With the state of phase shift maintained as described above, the phase relationship among the respective phases in the current pattern is maintained. For example, if the current pattern is the pattern #2, the phase relationship illustrated in FIG. 4 is maintained. FIG. 4 corresponds to FIG. 13A. In this case, rises of the respective PWM signal in Phase A, Phase B, and Phase C are shifted in timing by time lengths which allow detection of the currents by the shunt resistance Rs. Therefore, since the sufficient length of the current detection terms W1 and W2 are secured, even though the state in which the phase shift is not performed continues from then onward, detection of the motor current is thus achieved without issue.

Figure 5:
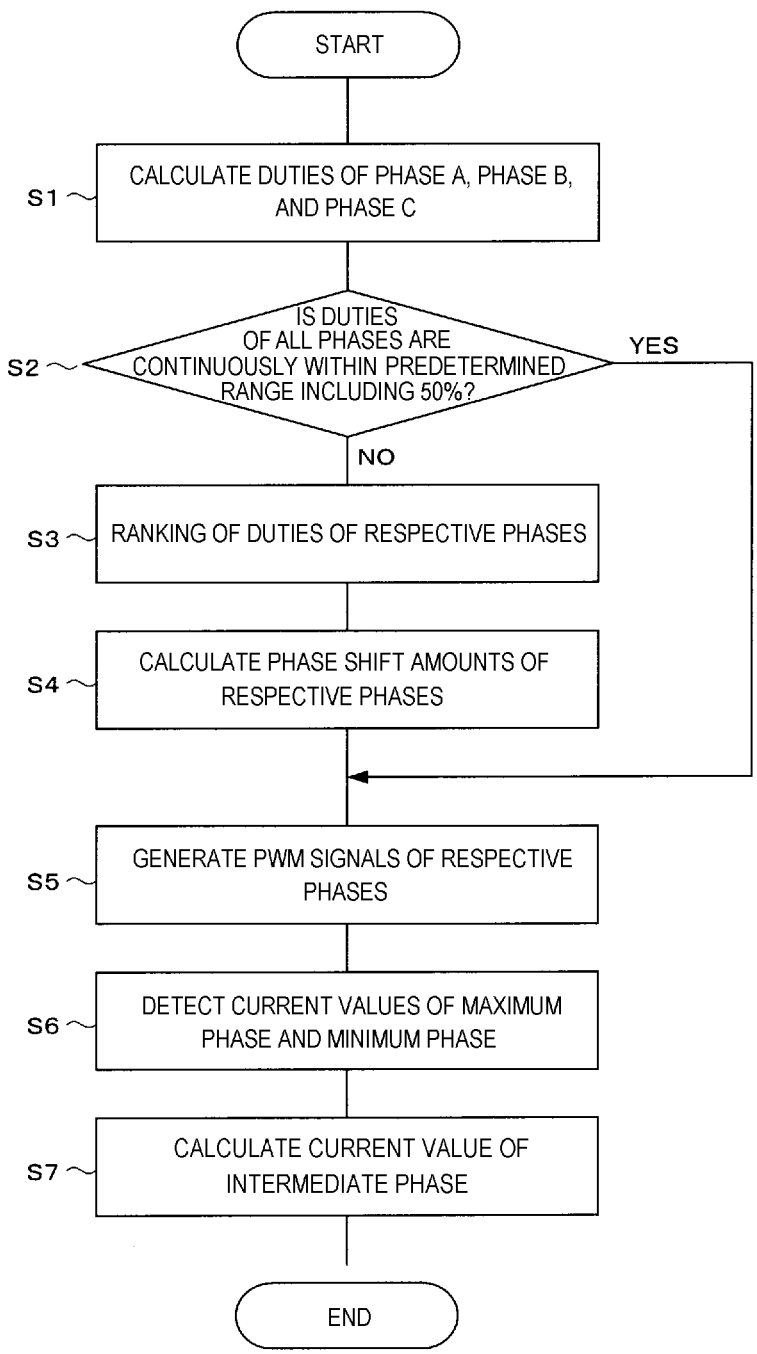
FIG. 5 is a flowchart illustrating a procedure of phase shifting.

FIG. 5 is a flowchart illustrating a process performed by the CPU 1 in the phase shifting described above. A series of procedures in this flowchart is repeatedly executed at every control cycle.

In Step S1, the respective duties in Phase A, Phase B, and Phase C are calculated by the duty calculating unit 12 on the basis of the current values or the like in the respective phases detected in a previous control cycle.

In Step S2, allowability of the phase shift is determined by the phase shift allowability determining unit 17. Specifically, the phase movement allowability determining unit 17 determines whether or not the duties in the respective phases calculated in Step S1 are continuously included within the predetermined range Z illustrated in FIG. 3. When it is determined that part or all of the duties in the respective phases are not included within the predetermined range Z in the determination of the previous time, and a determination of this time is made such that all of the duties in the respective phases are included within the predetermined (Step S2: NO), all the duties are not included continuously within the predetermined range Z. Therefore, it is determined that the phase may be moved and the procedure goes to Step S3. Accordingly, detection of the current is enabled as described later. When it is determined that all of the duties in the respective phases are included within the predetermined range Z in the determination of the previous time, and a determination of this time is made such that all of the duties in the respective phases are included within the predetermined range in the determination of this time (Step S2: Yes), all the duties are included continuously within the predetermined range Z. Therefore, it is determined that the phases cannot be moved and the procedure goes to Step S5 without performing Step S3 and Step S4. At this time, since the phases are already shifted an this shift state is maintained, the currents can be detected. If the determination is that part or all of the duties in the respective phases are not included within the predetermined range Z (Step S2; NO), it is determined that the phases can be moved irrespective of the result of determination of this time, and the procedure goes to Step S3.

In Step S3, ranking of the duties is performed by comparing the magnitudes of the duties in the respective phases calculated in Step S1 by the duty comparing unit 14. In other words, the maximum phase, the intermediate phase, and the minimum phase are determined.

In Step S4, the phase shift amounts in the maximum phase, the intermediate phase, and the minimum phase are calculated by the phase shift amount calculating unit 15 from the result of the ranking in Step S3.

In Step S5, the PWM signals are generated by the phase shift amount generating unit 13 on the basis of the duties calculated in Step S1 and the phase shift amounts calculated in Step S4.

In Step S6, the values of the currents in the maximum phase and the minimum phase flowing to the shunt resistance Rs are detected in the current detection terms W1 and W2.

In Step S7, by using the current values in two phases detected in Step S6, the current value of the remaining intermediate phase is obtained by an arithmetic operation.

Various embodiments in addition to those described above are within a scope of the invention. For example, in one or more of the embodiments described above, the values of α and β in FIG. 3 are set to 1% and the predetermined range Z is set to a range from 51% to 49%. However, these are examples only, and the values of α and β may be set to arbitrary values (0.5% for example) in accordance with the properties of the motor 6. According to one or more embodiments of the present invention, the ranges of α and β are 2%≥α≥0%, 2%>β≥0%.

In one or more of the embodiments described above, the phase movement allowability determining unit 17 is provided, and the state of phase shift is maintained by outputting the phase state maintaining signals from the phase movement allowability determining unit 17 to the phase shift unit 16. However, the invention is not limited thereto. For example, the phase shift amount calculating unit 15 may be configured not to output the phase shift amounts to the phase shift unit 16 if all the results of comparison of the duties in the respective phases obtained by the duty comparing unit 14 are included within the predetermined range Z. In this configuration, the phase shift is not performed in the phase shift unit 16, so that the state of phase shift may be maintained. In this case, the phase shift allowability determining unit 17 is not necessary, and the duty comparing unit 14 and the phase shift amount calculating unit 15 constitute the "phase state maintaining unit" of one or more embodiments of the invention.

In one or more of the embodiments described above, the phases of the PWM signals are shifted directly by the phase shift unit 16. However, the phases of the phases of the PWM signals may be shifted as a consequence by shifting the phases of the carrier signals generated for the respective phases. In this case, in FIG. 2, the phase shift unit 16 may be provided between the carrier signal generating unit 11 and the PWM signal generating unit 13.

As regards the phase shifting, the intermediate phase and the minimum phase are shifted by a predetermined amount that allows detection of the current with reference to the maximum phase in the example illustrated in FIG. 7. However, the invention is not limited thereto. For example, as described also in JP-A-2010-279141, the maximum phase and the minimum phase may be shifted by a predetermined amount that allows detection of the current with respect to the intermediate phase, or the maximum phase and the intermediate phase may be shifted by a predetermined amount that allows detection of the current with respect to the minimum phase.

In one or more of the embodiments described above, it is determined that the phases cannot be moved if all the duties in the respective phases are continuously included in the predetermined range Z, and the state of phase shift is maintained. However, the invention is not limited thereto. For example, when all the duties in the respective phases are continuously included within the predetermined range Z, the frequency of phase shifting may be reduced in comparison with the case where part or the entire part of the duties in the respective phases are not included in the predetermined range Z. For example, in the normal state, the phase shift amounts are calculated every time when the arithmetic operation of the duties is performed. However, when all the duties in the respective phases are continuously included within the predetermined range, the arithmetic operation of the phase shift amounts may be performed once every other arithmetic operation of the duties.

Instead of the method described above, the state of phase shift may be maintained when the difference between the maximum values and the minimum values of the duties in the respective phases calculated by the duty calculating unit 12 is continuously smaller than the predetermined value Z'. Alternatively, the frequency of the phase shifting may be reduced in the same manner as descried above when the difference between the maximum values and the minimum values of the duties in the respective phases calculated by the duty calculating unit 12 is continuously smaller than the predetermined value Z'.

Although the control apparatus for the 3-phase motor has been described in one or more of the embodiments described above, the invention is not limited to the 3-phase motor, and may be applied to the control apparatus for multi-phase motors having four phases or more. In this case, a plurality of pairs of upper and lower arms are provided in the inverter circuit 2 in accordance with the number of phases.

Although the FET is given as an example of the switching elements Q1 to Q6 of the inverter circuit 2 in one or more of the embodiments described above, other types of switching elements such as IGBT (Insulated Gate Bipolar Transistor) may be used.

Although the brushless motor has given as an example of the motor 6 in one or more of the embodiments described above, one or more embodiments of the invention may be applied to cases where other types of motors are controlled.

Moreover, although the motor control apparatus used in electric power steering apparatus for vehicles are described in one or more of the above embodiments, one or more embodiments of the invention may be applied to the motor control apparatus to be used in other apparatuses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor control apparatus comprising:
   an inverter circuit comprising:
   a plurality of pairs of upper and lower arms provided so as to correspond to the number of phases, and
   switching elements provided on each of the upper arms and the lower arms of each phase that drive a motor on the basis of ON or OFF operations of the respective switching elements;
   a single current detector that detects a current of the motor flowing through the inverter circuit;
   a duty calculator that calculates duties of a PWM signals for turning the switching elements ON or OFF on the basis of a deviation between a current value of the current detected by the current detector and a target current value;
   a PWM signal generator that generates the PWM signals on the basis of the duties calculated by the duty calculator, and outputs the corresponding PWM signals to the respective switching elements;
   a phase shifting unit that compares the magnitude of the duties calculated by the duty calculator and shift the phases of the PWM signals of the predetermined phases on the basis of a result of comparison; and
   a phase state maintaining unit that maintains the state of phase shift generated by the phase shifting unit,
   wherein the phase state maintaining unit maintains the state of phase shift generated by the phase shifting unit when the duties of all the phases calculated by the duty calculator is continuously 50%.

2. The motor control apparatus according to claim 1, wherein the phase state maintaining unit maintains the state of phase shift generated by the phase shifting unit when the duties of all the phases calculated by the duty calculator are continuously included within a range from 50%+α as an upper limit to 50%−β including 50%, and being lower than a predetermined value.

3. The motor control apparatus according to claim 2, wherein the values of α and β satisfy an equality of α=β=1%, and the range lower than the predetermined value is 51% to 49%.

4. The motor control apparatus according to claim 3, wherein the phase state maintaining unit maintains the state of phase shift generated by the phase shifting unit in a state in which rises of the PWM signals in the respective phases are shifted in timing by time lengths which allow detection of the currents by the current detector.

5. The motor control apparatus according to claim 2, wherein the phase state maintaining unit maintains the state of phase shift generated by the phase shifting unit in a state in which rises of the PWM signals in the respective phases are shifted in timing by time lengths which allow detection of the currents by the current detector.

6. The motor control apparatus according to claim 1, wherein the phase state maintaining unit maintains the state of phase shift generated by the phase shifting unit in a state in which rises of the PWM signals in the respective phases are shifted in timing by time lengths which allow detection of the currents by the current detector.

7. The motor control apparatus according to claim 1, wherein the phase state maintaining unit maintains the state of phase shift generated by the phase shifting unit when the difference between a maximum value and a minimum value of the duties in the respective phases calculated by the duty calculator is continuously smaller than a predetermined value.

8. The motor control apparatus according to claim 1, further comprising:
   a phase movement frequency reducer that reduces the frequency of phase shift generated by the phase shifting unit when the duties of all the phases calculated by the duty calculator are continuously 50% instead of the phase state maintaining unit.

9. The motor control apparatus according to claim 1, further comprising:
a phase movement frequency reducer that reduces the frequency of phase shift by the phase shifting unit when the difference between the maximum value and the minimum value of the duties of the respective phases calculated by the duty calculator is continuously smaller than the predetermined value is provided instead of the phase state maintaining unit.

* * * * *